March 12, 1940.　　　　C. C. FISH　　　　2,193,091

VEHICLE TOP

Filed Nov. 23, 1938　　　　3 Sheets-Sheet 1

INVENTOR
Carl C. Fish.
BY
Harness, Dickey & Pierce.
ATTORNEYS.

March 12, 1940.   C. C. FISH   2,193,091
VEHICLE TOP
Filed Nov. 23, 1938   3 Sheets-Sheet 2
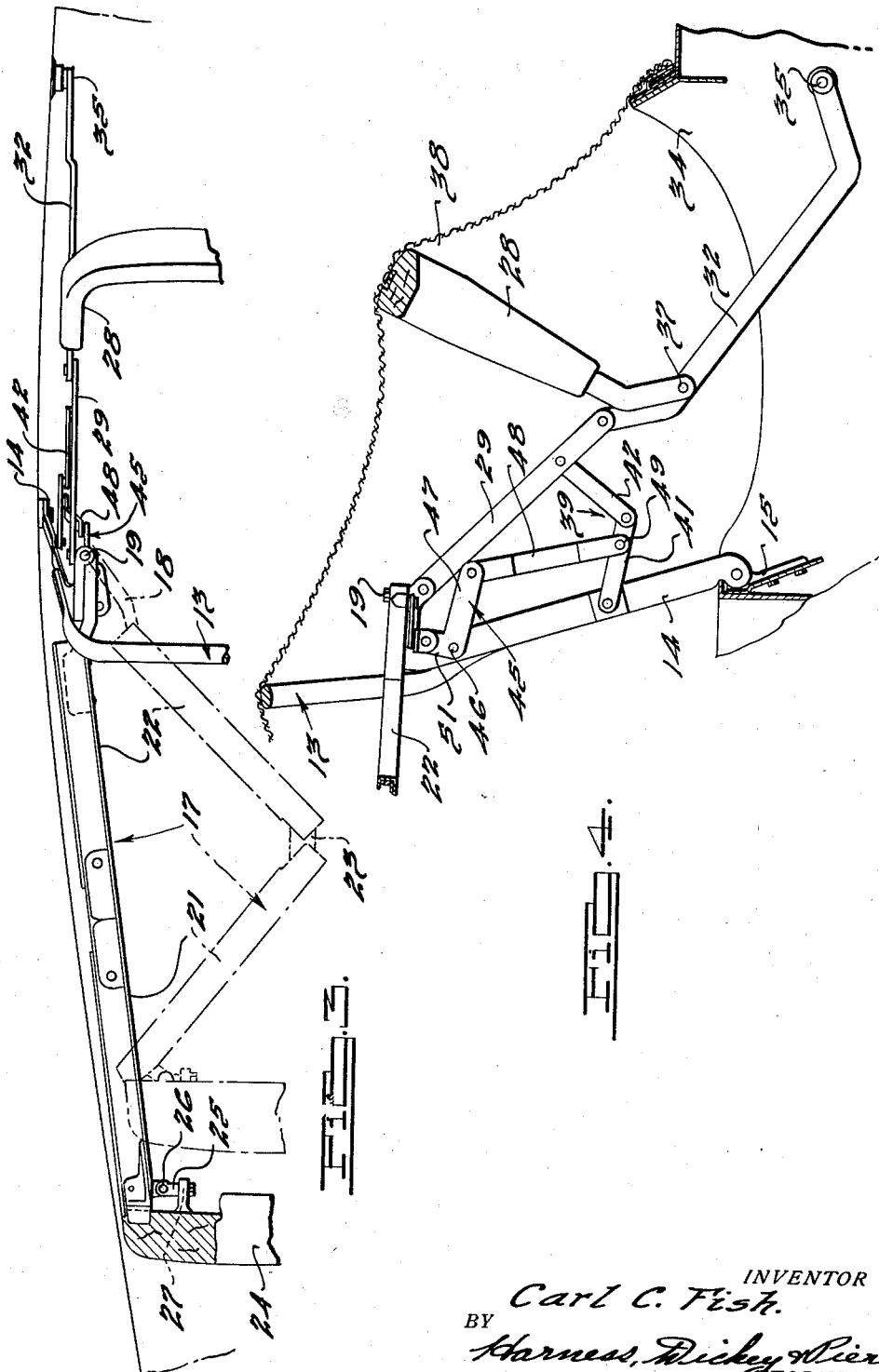
INVENTOR
Carl C. Fish.
BY
Harness, Dickey & Pierce
ATTORNEYS.

March 12, 1940.  C. C. FISH  2,193,091
VEHICLE TOP
Filed Nov. 23, 1938  3 Sheets-Sheet 3
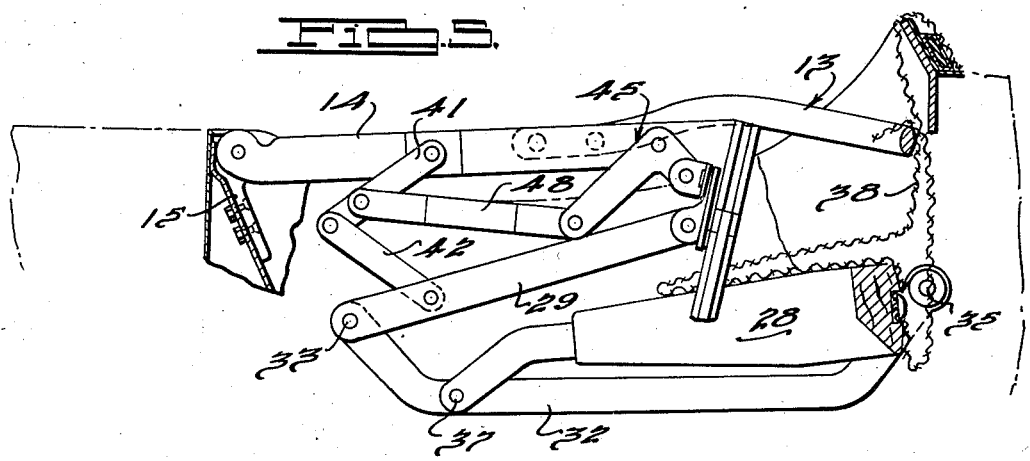
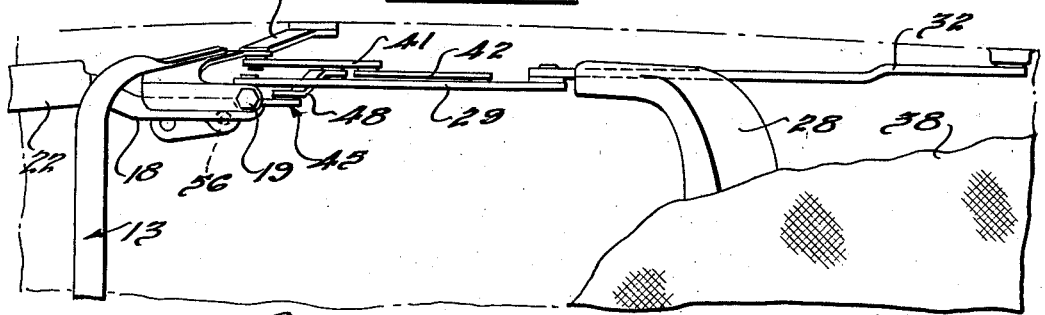
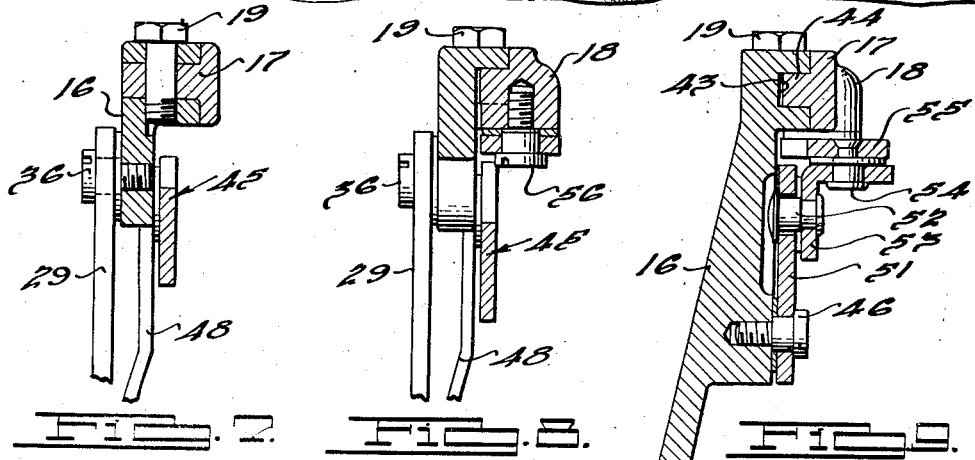
INVENTOR
Carl C. Fish.
BY Harness, Dickey & Pierce.
ATTORNEYS.

Patented Mar. 12, 1940

2,193,091

UNITED STATES PATENT OFFICE 2,193,091

VEHICLE TOP

Carl C. Fish, Detroit, Mich., assignor to The Murray Corporation of America, Detroit, Mich., a corporation of Delaware Application November 23, 1938, Serial No. 241,921

4 Claims. (Cl. 296—116)

My invention relates to automobile bodies, and particularly to a foldable top for a body of the convertible type.

Heretofore in the art, it has been customary to provide main and auxiliary bows and suitable interconnecting arms and links for retaining the top material in predetermined shape over the vehicle compartment when raised while permitting such top to be folded compactly within the body. A front head was employed which usually was attached to the top of the windshield, being retained in position by manually actuated securing means such as thumb nuts. Additional clamping means were employed in combination with the links and arms of the bows for retaining the bows in rigid relation when raised. To lower the top it was necessary to release the latter clamping means along with the thumb screws, or other securing means for the header, to permit the occupant to lower the top.

In practicing my present invention, I employ mechanical means for locking a toggle in on-center position for retaining the bows in fixed relation when the top is raised. The toggles are connected through links and bell cranks to the side bars of the top which interconnect the main bow to the header. The side bars embody hinged elements which fold upon themselves to move the header against the main bow while operating bell cranks to break the toggle permitting the bows to collapse within the body compartment. When the top is raised, the movement of the side bars into unit extended relation operates the bell cranks in the opposite direction to move the toggle to on-center position to latch the bows in predetermined relation to each other and the body when the top is in raised position.

Accordingly, the main objects of my invention are: to provide a top which has the bows thereof secured in rigid relation to each other and the body when the top is extended and latched to the windshield; to provide a mechanism for latching a main and auxiliary bow in predetermined relation to the body when the top is raised, including mechanical elements actuated by the top side bars when moved in extended relation to each other; to provide a convertible top with jointed side bars which fold upon themselves and which actuate mechanical elements for automatically latching the support for the bows of the top in predetermined relation to the body; to provide vertically disposed bell cranks, actuated when the top is raised for automatically latching the bow supporting elements in rigid predetermined relation to the body; and in general, to provide automatic means for latching the top elements in raised position which is simple in construction, positive in operation and economical of manufacture.

Other objects and features of novelty of my invention will be either specifically pointed out, or will become apparent when referring, for a better understanding of my invention to the following description taken in conjunction with the accompanying drawings, wherein:

Fig. 3 is a broken plan view of the top supporting elements employed on one side of the vehicle body;

Fig. 4 is a view of structure, similar to that illustrated in Fig. 2, with the elements in unlatched partially lowered position;

Fig. 5 is a view of structure similar to that illustrated in Fig. 2, with the top in lowered position;

Fig. 6 is a plan view of the top supporting elements on one side of the body shown in relation to the parts illustrated in Fig. 2;

Fig. 7 is an enlarged sectional view of the structure illustrated in Fig. 2, taken on the line 7—7 thereof;

Fig. 8 is an enlarged sectional view of the structure illustrated in Fig. 2, taken on the line 8—8 thereof; and, Fig. 9 is an enlarged sectional view of the structure illustrated in Fig. 2, taken on the line 9—9 thereof.

Figure 1:
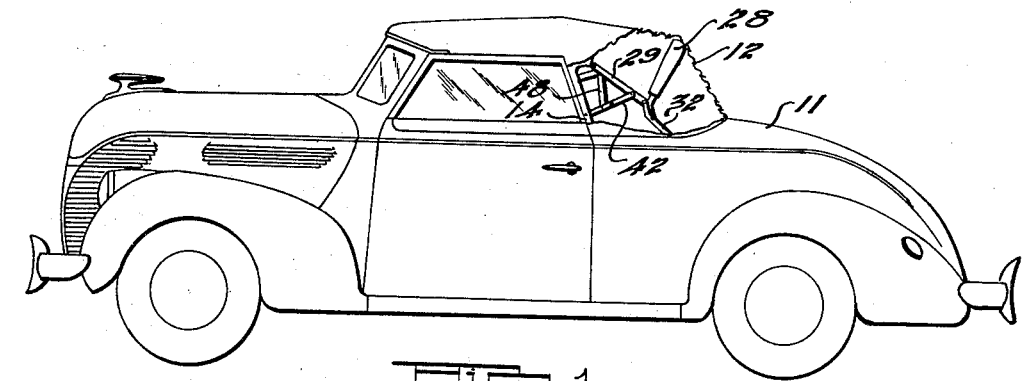
Figure 1 is a side view in elevation of a vehicle body having the convertible top thereof, embodying features of my invention, broken away.
Figure 2:
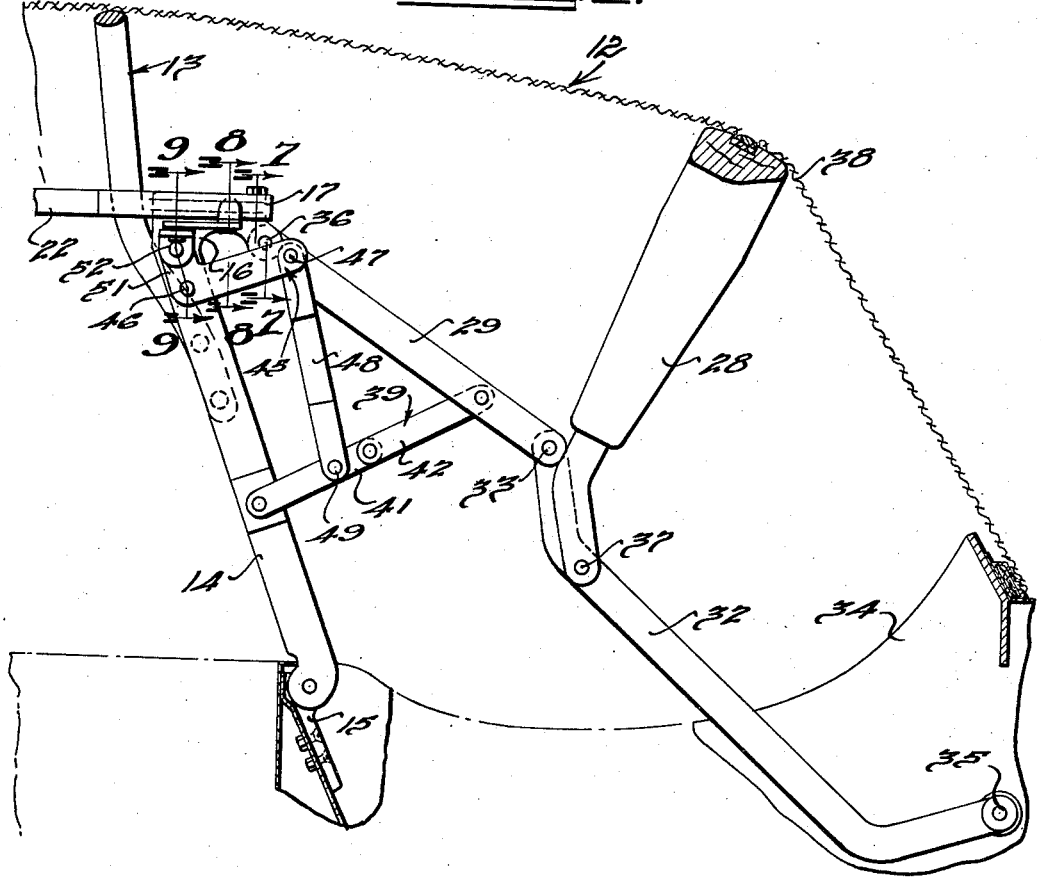
Fig. 2 is a longitudinal sectional view of the rear portion of the top illustrated in Fig. 1, with parts in raised position.

On the automobile illustrated in Fig. 1, having a body 11 of the convertible type, a foldable top 12 extends over the driver compartment and it is to be understood that such top could be lengthened in the conventional manner and be employed with the landau type of body. A bow 13 extends across the body and is riveted or otherwise secured to uprights 14 which are pivoted on brackets 15 at the sides of the body rearwardly of the doors forming the main bow of the top. The ends of the uprights 14 are the means of supporting castings 16 having their longitudinal dimension extending lengthwise of the body. Foldable side bars 17 have their rear ends 18 pivoted to the casting 16 by bolts 19. The side bars comprise elements 21 and 22 which are pivoted together at 23 in the conventional manner and are pivoted at the front ends to the header bar 24 by universally jointed pivots 25. The pivots 25 are capable of hinging about the pins 26 and also about the studs 27.

A support for a secondary bow 28 is provided by links 29 and 32 which are pivoted together at 33. The opposite end of the links 32 are pivoted to the body sides near the top receiving well 34, on pivots 35. The opposite end of the links 29 are pivoted to the castings 16 on pivots 36. The auxiliary bow 28 is pivoted on the links 32 on pivots 37, the opposite end of the bow being retained in position when raised by the top material 38. It will be apparent that the links 29 and 32 will collapse if not otherwise secured when positioning the bow 28.

Toggles 39, formed of links 41 and 42 which are pivoted together, are pivotally attached to the links 29 and uprights 14. When the links 41 and 42 are disposed in aligned relation, the links 29 and 32 are fixed in position to rigidly support the bow 28. To provide additional rigidity to the side elements when the top is raised, the castings 16 have slots 43 in their inner faces in which extending flanges 44 on the arms 18 of elements 22 project to retain the side bars 17 in rigid relation to the castings 16.

For moving the links 41 and 42 to and from toggle locking relation, I employ bell cranks 45 which are pivoted to the uprights 14 on pivots 46. One arm 47 of each bell crank is pivoted to a link 48 which links are connected to the links 41 of the toggles 39 by pivots 49. The opposite ends 51 of each bell crank have a loose pivotal connection with studs 52 on brackets 53. The brackets 53 are pivoted on pins 54 which are riveted to links 55. The opposite end of the links 55 are pivoted on the shoulder of screws 56 threaded in the arms 18 of the side bars 17.

The screws 56 are offset from the bolts 19 and as the side bars 17 are pulled inwardly to fold upon themselves, the screws 56 will move in an arc about the bolt 19 in a horizontal plane. Such movement moves the links 55 and brackets 53 rearwardly of the body and thereby rotates the bell cranks 45 toward the rear. The links 48 are moved downwardly, breaking the toggle relation of the links 41 and 42 and permitting the links 29 and 32 to collapse and fold upon themselves with the auxiliary body 28 disposed therebetween. When the elements of the side bars 17 are moved from or into a position of alignment, the bell cranks 45 are operated to either collapse the toggles 39 or move them into latching position, respectively.

When raising the top, it is only necessary to grasp the header bar 24, pull it forwardly to a position adjacent to the windshield and force the elements 21 and 22 of the side bars 17 into extended relation. The top cloth 38 is stretched over the top frame elements which are rigidly held in position relative to each other and the body. The top is held in raised position when the header bar is secured by thumb nuts or other means which engage projections on the windshield frame. When lowering the top, the header bar is released from the windshield frame and the extended relation of the side bars is broken as the side bar elements collapse upon themselves the toggles 39 are broken permitting the links 29 and 32 to fold upon themselves and the auxiliary bow 28. Through the simple manipulation of the header bar 24 and the side bars 17 the supporting elements of the top are completely controlled when moved to raised or lowered position. The latching of the header bar to the windshield frame is all that is required to retain the top in locked position on the body.

While I have described and illustrated but a single embodiment of my invention, it will be apparent to those skilled in the art that various changes, omissions, additions and substitutions may be made therein without departing from the spirit and scope of my invention, as set forth in the accompanying claims.

What is claimed is:

1. A convertible top for a vehicle body having a main bow, an auxiliary bow, pivotal links forming collapsible supports for the ends of said auxiliary bow, horizontally foldable side bars extending forwardly of said main bow, a pair of toggles for latching said pivotal links against collapse when the top is raised, vertically disposed bell cranks supported by said main bow, links interconnecting one arm of the bell cranks to the side bars near the rear pivoted ends thereof, additional links connecting the other arm of said bell cranks to said toggles, whereby the horizontal movement of the side bars causes the first said links to move lengthwise of the body to rotate the bell crank and thereby operate said toggles through said addditional links.

2. A convertible top for a vehicle body having a main bow, an auxiliary bow, pivotal links forming collapsible supports for the ends of said auxiliary bow, horizontally disposed foldable side bars extending forwardly of said main bow and pivoted thereon, a header bar pivoted to the opposite end of said foldable side bars, a pair of toggles for latching said pivotal links against collapse when the top is raised, vertically disposed bell cranks supported by said main bow, links interconnecting one arm of the bell cranks to said toggles, brackets pivoted to the other arms of said bell cranks and links interconnecting the horizontally disposed portion of said brackets to said foldable side bars near the pivots attaching said bars to said pivotal links whereby the horizontal movement of the side bars operates the links attached thereto in a horizontal plane to operate the bell cranks through the brackets in a vertical plane to operate through the links to move the toggles to locking and unlocking positions.

3. A convertible top for a vehicle body having a main bow, an auxiliary bow, pivotal links forming collapsible supports for the ends of said auxiliary bow, horizontally disposed foldable side bars extending forwardly of said main bow and pivoted thereon, a header bar pivoted to the opposite end of said foldable side bars, a pair of toggles for latching said pivotal links against collapse when the top is raised, vertically disposed bell cranks supported by said main bow, links interconnecting one arm of the bell cranks to said toggles, brackets pivoted to the other arms of said bell cranks and links interconnecting the horizontally disposed portion of said brackets to said foldable side bars near the pivots attaching said bars to said pivotal links whereby the horizontal movement of the side bars operates the links attached thereto in a horizontal plane to operate the bell cranks through the brackets in a vertical plane to operate through the links to move the toggles to locking and unlocking positions, there being a lost motion connection between the brackets and the arms of the bell cranks to which they are attached.

4. A convertible top for a vehicle body having a main bow, an auxiliary bow, pivotal links forming collapsible supports for the ends of said auxiliary bow, horizontally foldable side bars extending forwardly of the main bow and pivoted thereto, a pair of toggles for latching said pivotal links against collapse when the top is raised, vertically disposed bell cranks pivoted to the arms of the main bow, links interconnecting one arm of the bell cranks to said toggles, and means interconnecting the other ends of the bell cranks to said foldable side bars offset from the pivots thereof joining the bars to said bow whereby the movement of said bars operates said means to rotate said bell cranks to operate the toggles to latched or unlatched positions.

CARL C. FISH.